(12) United States Patent
Gray et al.

(10) Patent No.: US 10,911,389 B2
(45) Date of Patent: Feb. 2, 2021

(54) RICH PREVIEW OF BUNDLED CONTENT

(71) Applicant: Microsoft Technology Licensing, LLC, Redmond, WA (US)

(72) Inventors: Linda Chen Gray, Kirkland, WA (US); Sherry Pei-chen Lin, Redmond, WA (US); Thomas Coolidge Stanton, Seattle, WA (US); Andrew James Peacock, Seattle, WA (US); Megan Marie Quintero, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/430,290

(22) Filed: Feb. 10, 2017

(65) Prior Publication Data

US 2018/0234375 A1 Aug. 16, 2018

(51) Int. Cl.
| | | |
|---|---|---|
| *H04L 12/58* | (2006.01) | |
| *G06N 20/00* | (2019.01) | |
| *G06F 16/28* | (2019.01) | |
| *G06Q 10/10* | (2012.01) | |
| *G06F 3/0482* | (2013.01) | |

(52) U.S. Cl.
CPC ............ *H04L 51/22* (2013.01); *G06F 16/285* (2019.01); *G06N 20/00* (2019.01); *G06Q 10/107* (2013.01); *G06F 3/0482* (2013.01)

(58) Field of Classification Search
None
See application file for complete search history.

(56) References Cited

U.S. PATENT DOCUMENTS

| 6,424,362 B1 | 7/2002 | Bornstein et al. |
| 7,546,352 B1 | 6/2009 | Bhattiprolu et al. |
| (Continued) | | |

FOREIGN PATENT DOCUMENTS

| EP | 1777650 A1 | 4/2007 |
| WO | 2009109657 A2 | 9/2009 |
| (Continued) | | |

OTHER PUBLICATIONS

Casey, Keith, "Making Your Inbox Intelligent with Context.IO and Twilio", https://www.twilio.com/blog/2013/10/contexio-and-twilio.html, Published on: Oct. 10, 2013, 6 pages.
(Continued)

*Primary Examiner* — Esther B. Henderson

(57) ABSTRACT

Non-limiting examples describe automated management of rich content previews associated with bundled content of an application/service. As an example, a bundle of content may be a bundle of emails created within an email service. Email content associated with a bundle of emails may be accessed. The email content may be evaluated based on application of machine learning model that: determines an entity type associated with the bundle of emails based on the tag, identifies a state associated with the bundle of emails, and determines relevancy of specific email content in association with a determined entity type and the identified state associated with the bundle of emails. A rich content preview for the bundle of emails may be generated based on an evaluation of the email content.

20 Claims, 7 Drawing Sheets

(56) References Cited

U.S. PATENT DOCUMENTS

| | | | |
|---|---|---|---|
| 7,693,940 B2* | 4/2010 | Carmel | G06F 17/279 709/203 |
| 7,707,255 B2 | 4/2010 | Satterfield et al. | |
| 7,831,676 B1 | 11/2010 | Nagar | |
| 7,885,948 B2 | 2/2011 | Johnson et al. | |
| 7,904,525 B2 | 3/2011 | Eggers et al. | |
| 8,156,123 B2 | 4/2012 | Tribble et al. | |
| 8,209,617 B2 | 6/2012 | Vanderwende et al. | |
| 8,224,914 B2 | 7/2012 | Thomas et al. | |
| 8,463,827 B2 | 6/2013 | Ramarao et al. | |
| 8,548,973 B1 | 10/2013 | Kritt et al. | |
| 8,745,045 B2 | 6/2014 | Bawri et al. | |
| 8,996,530 B2 | 3/2015 | LuVogt et al. | |
| 9,076,147 B2* | 7/2015 | Khoo | G06Q 10/107 |
| 2005/0091184 A1 | 4/2005 | Seshadri et al. | |
| 2005/0182773 A1 | 8/2005 | Feinsmith | |
| 2006/0206495 A1 | 9/2006 | Van gageldonk et al. | |
| 2007/0226204 A1 | 9/2007 | Feldman | |
| 2007/0239755 A1* | 10/2007 | Mahoney | G06Q 10/10 |
| 2007/0266095 A1 | 11/2007 | Billsus et al. | |
| 2008/0086703 A1* | 4/2008 | Flynt | G06F 3/0482 715/853 |
| 2008/0281927 A1 | 11/2008 | Vanderwende et al. | |
| 2009/0187548 A1 | 7/2009 | Ji et al. | |
| 2010/0036922 A1 | 2/2010 | Stafford et al. | |
| 2010/0169320 A1 | 7/2010 | Patnam et al. | |
| 2010/0223261 A1 | 9/2010 | Sarkar | |
| 2010/0257230 A1* | 10/2010 | Kroeger | H04L 67/2861 709/203 |
| 2010/0332428 A1 | 12/2010 | McHenry et al. | |
| 2011/0004573 A1 | 1/2011 | Chitiveli et al. | |
| 2011/0126126 A1 | 5/2011 | Blair | |
| 2011/0307482 A1 | 12/2011 | Radlinski et al. | |
| 2012/0005284 A1 | 1/2012 | Tse | |
| 2012/0158728 A1* | 6/2012 | Kumar | G06F 17/30873 707/737 |
| 2012/0173533 A1 | 7/2012 | Ramarao et al. | |
| 2012/0226681 A1 | 9/2012 | Paparizos et al. | |
| 2013/0024788 A1* | 1/2013 | Olsen | G06Q 10/10 715/753 |
| 2013/0055105 A1 | 2/2013 | Spierer | |
| 2013/0166548 A1 | 6/2013 | Puzicha et al. | |
| 2013/0198296 A1 | 8/2013 | Roy et al. | |
| 2013/0241499 A1 | 9/2013 | Johnson et al. | |
| 2014/0006409 A1 | 1/2014 | Prosnitz et al. | |
| 2014/0040770 A1* | 2/2014 | Khoo | G06F 3/0482 715/752 |
| 2014/0046945 A1 | 2/2014 | Deolalikar et al. | |
| 2014/0108066 A1 | 4/2014 | Lam et al. | |
| 2014/0143254 A1 | 5/2014 | Datta et al. | |
| 2014/0172821 A1 | 6/2014 | Hu et al. | |
| 2014/0173457 A1 | 6/2014 | Wang et al. | |
| 2014/0289258 A1 | 9/2014 | Joshi et al. | |
| 2014/0310281 A1 | 10/2014 | Somekh et al. | |
| 2014/0372446 A1 | 12/2014 | Bell et al. | |
| 2015/0127754 A1 | 5/2015 | Clark et al. | |
| 2015/0186478 A1 | 7/2015 | Yan et al. | |
| 2015/0186494 A1 | 7/2015 | Gilad et al. | |
| 2015/0234893 A1 | 8/2015 | Kaasten et al. | |
| 2015/0256499 A1 | 9/2015 | Kumar et al. | |
| 2015/0326521 A1 | 11/2015 | Osipkov et al. | |
| 2015/0341300 A1* | 11/2015 | Swain | G06F 16/287 707/738 |
| 2016/0080303 A1 | 3/2016 | Deolalikar et al. | |
| 2016/0173433 A1 | 6/2016 | Bastide et al. | |
| 2016/0182311 A1 | 6/2016 | Boma | |
| 2016/0241499 A1 | 8/2016 | Hailpern et al. | |
| 2016/0301705 A1 | 10/2016 | Higbee et al. | |
| 2016/0314182 A1 | 10/2016 | Zhang et al. | |
| 2016/0314184 A1 | 10/2016 | Bendersky et al. | |
| 2016/0323223 A1 | 11/2016 | Davis et al. | |
| 2017/0004199 A1 | 1/2017 | Hausler et al. | |
| 2017/0228114 A1 | 8/2017 | Brett et al. | |
| 2018/0006973 A1* | 1/2018 | Hays | H04L 67/306 |
| 2018/0232441 A1 | 8/2018 | Lin et al. | |
| 2018/0234374 A1 | 8/2018 | Gray et al. | |
| 2018/0234376 A1 | 8/2018 | Gray et al. | |
| 2018/0234377 A1 | 8/2018 | Gray et al. | |
| 2020/0028814 A1 | 1/2020 | Gray et al. | |

FOREIGN PATENT DOCUMENTS

| | | |
|---|---|---|
| WO | 2013113093 A1 | 8/2013 |
| WO | 2016144992 A1 | 9/2016 |
| WO | 2016164844 A1 | 10/2016 |

OTHER PUBLICATIONS

Smith, Lauren, "The Ultimate Guide to Preview Text Support", https://litmus.com/blog/the-ultimate-guide-to-preview-text-support, Published on: Apr. 29, 2015, pages.

"Group or ungroup messages in your Inbox", https://support.office.com/en-us/article/Group-or-ungroup-messages-in-your-Inbox-c6d17df3-8488-42b2-a773-278686205478, Retrieved on: Dec. 21, 2016, 2 pages.

"Non Final Office Action Issued in U.S. Appl. No. 15/430,270", dated Oct. 24, 2018, 27 Pages.

"Non Final Office Action Issued in U.S. Appl. No. 15/430,316", dated Oct. 17, 2018, 21 Pages.

"Non Final Office Action Issued in U.S. Appl. No. 15/430,245", dated Mar. 11, 2019, 11 Pages.

"Non Final Office Action Issued in U.S. Appl. No. 15/430,327", dated Mar. 8, 2019, 15 Pages.

"Notice of Allowance Issued in U.S. Appl. No. 15/430,327", dated Jul. 10, 2019, 15 Pages.

"How can I Prevent Email Threads I have Assigned to a List from Appearing in my Inbox again", Retrieved From: https://sortd.freshdesk.com/support/solutions/articles/6000046083-how-can-i-prevent-email-threads-i-have-assigned-to-a-list-from-appearing-in-my-inbox-again-, Aug. 20, 2015, 1 Page.

"How to Make Your Own Labels in Google Inbox", Retrieved From: https://web.archive.org/web/20161222143019/http://www.wikihow.com:80/Make-Your-Own-Labels-in-Google-Inbox, Dec. 22, 2016, 6 Pages.

"How to Save Email Into Evemote", Retrieved From: https://web.archive.org/web/20161021055528/https://help.evernote.com/hc/en-us/articles/209005347-How-to-save-email-into-Evernote, Retrieved on: Oct. 21, 2016, 6 Pages.

"How to Use Bundles in Google Inbox", Retrieved From: https://web.archive.org/web/20170125202648/https://www.wikihow.com/Use-Bundles-in-Google-Inbox, Retrieved on: Jan. 25, 2017, 5 Pages.

"How to Use Google Inbox", Retrieved From: https://web.archive.org/web/20160810050026/https://www.wikihow.com/Use-Google-Inbox, Retrieved on: Aug. 10, 2016, 7 Pages.

"Inbox by Gmail 101", Retrieved From: https://web.archive.org/web/20150705015438/http://gmail-miscellany.blogspot.com:80/2014/10/inbox-by-gmail-101.html, Oct. 22, 2014, 14 Pages.

"Inbox by Gmail Help", Retrieved From: https://web.archive.org/web/20170208235410/https://support.google.com/inbox/?hl=en, Retrieved on: Feb. 8, 2017, 115 Pages.

"Threading Messages Together", Retrieved From: https://web.archive.org/web/20170128161844/https://api.slack.com/docs/message-threading, Retrieved on: Jan. 28, 2017, 13 Pages.

"View & Organize your Inbox", Retrieved From: https://web.archive.org/web/20160513074613/https://support.google.com/mail/topic/3394656?hl=en&ref_topic=3394150, Retrieved On: May 13, 2016, 43 Pages.

"Final Office Action Issued in U.S. Appl. No. 15/430,270", dated May 20, 2019, 29 pages.

"Final Office Action Issued in U.S. Appl. No. 15/430,316", dated May 16, 2019, 38 Pages.

Aberdeen, et al., "The Learning Behind Gmail Priority Inbox", Retrieved From: https://web.archive.org/web/20150218101156/http://static.googleusercontent.com/media/research.google.com/en//pubs/archive/36955.pdf, Retrieved On: Feb. 18, 2015, 4 Pages.

Agarwal, Shalini, "A Bit about Bundles in In box", Retrieved From: https://web.archive.org/web/20161007091618/https://gmail.googleblog.

(56) References Cited

OTHER PUBLICATIONS com/2014/11/a-bit-about-bundles-in-inbox.html, Nov. 19, 2014, 5 Pages.
Biersdorfer, J D., "Use Labels to Sort Messages in Gmail", Retrieved From: https://web.archive.org/web/20161230040642/http://www.nytimes.com/2016/12/21/technology/personaltech/use-labels-to-sort-messages-in-gmail.html, Dec. 21, 2016, 2 Pages.
Einstein, Michael, "Email Processing and Triage Basics", Retrieved From: https://web.archive.org/web/20190426210912/https://michael-einstein.squarespace.com/blog/e-mail-triage-basics, May 29, 2014, 4 Pages.
Einstein, Michael, "Use Invisible Hashtags to Track Emails", Retrieved From: https://www.emailoverloadsolutions.com/blog/invisible-email-hashtags, Dec. 8, 2016, 5 Pages.
Einstein, Michael, "Using Outlook Categories: A Primer", Retrieved From: https://web.archive.org/web/20160503124600/https://www.emailoverloadsolutions.com/blog/using-e-mail-categories-a-primer, Jul. 22, 2014, 8 Pages.
Frost, Aja, "Tagging Tips: How to Organize Files and Other Information with Tags", Retrieved From: https://zapier.com/blog/how-to-use-tags-and-labels/#email, Aug. 11, 2016, 30 Pages.
Hiscott, Rebecca, "The Beginner's Guide to the Hashtag", Retrieved From: https://web.archive.org/web/20160206044144/https://mashable.com/2013/10/08/what-is-hashtag/, Oct. 8, 2013, 9 Pages.
Irish, Emily, "Forget in box Zero: Manage Your in box Better with These Smart Email Workflows", Retrieved From: https://zapier.com/blog/email-inbox-workflow/, Oct. 25, 2016, 23 Pages.
Kricfalusi, Elizabeth, "Stop the Email Threading Madness", Retrieved From: https://web.archive.org/web/20170606154125/https://techforluddites.com/email-turn-off-conversation-view-gmail-yahoo-outlook-ios/, May 16, 2017, 11 Pages.
Kricfalusi, Elizabeth, "Turn Off Email Grouping in Outlook", Retrieved From: https://web.archive.org/web/20160419205247/https://techforluddites.com/turn-off-email-grouping-in-outlook/, Jun. 30, 2015, 6 Pages.
Jatkar, Mihir, "3 Secret Ways to Use Hashtags You've Never Tried Before", Retrieved From: https://web.archive.org/web/20160213160318/https://www.makeuseof.com/tag/3-secret-ways-to-use-hashtags-that-make-digital-searches-easier-faster/, Aug. 16, 2013, 6 Pages.
Pinola, Melanie, "Add Invisible Hashtags to Your Emails for Better Search and Organization", Retrieved From: https://zapier.com/blog/email-hashtags-tip/, Nov. 28, 2016, 4 Pages.
Pinola, Melanie, "How I Finally Organized My Messy In box with Sortd", Retrieved From: https://web.archive.org/web/20170107202606/https://lifehacker.com/how-i-finally-organized-my-messy-inbox-with-sortd-1754956174, Jan. 26, 2016, 8 Pages.
"Final Office Action Issued in U.S. Appl. No. 15/430,245", dated Sep. 13, 2019, 13 Pages.
"How do I share trip details with others?", Retrieved From: https://www.airbnb.co.in/help/article/1175/how-do-i-share-trip-details-with-others, Dec. 20, 2016, 1 Page.
"How to Create Your Own Bundle in Google Inbox", Retrieved From: http:/www.wikihow.com/Create-Your-Own-Bundle-in-Google-Inbox, Nov. 7, 2014, 2 Pages.
"Team Chat and Collaboration Right From Gmail", Retrieved from: https://web.archive.org/web/20161101015942/gmaillabel.cloudhq.net/, Nov. 1, 2016, 5 Pages.
"Using Tags and Folders to Organize Your Mailbox", Retrieved From: http://docplayer.net/8609804-Zimbra-web-client-user-guide.html, Dec. 27, 2016, 22 Pages.
Aaron, "Clean up your inbox with bundles", Retrieved From: https://support.google.com/inbox/answer/6050237?hl=en&ref_topic=6067574, Dec. 20, 2016, 2 Pages.
Aaron, "Label emails in Inbox", Retrieved From: https://support.google.com/inbox/answer/6067566?hl=en, Dec. 20, 2016, 2 Pages.
Aaron, "Organize travel plans into Trip bundles", Retrieved From: https://support.google.com/inbox/answer/6228360?hl=en, Dec. 27, 2016, 3 Pages.
Arenas, et al., "SemFacet: Semantic Faceted Search over Yago", In Proceedings of the 23rd International Conference on World Wide Web, Apr. 7, 2014, 4 Pages.
Ayodele, et al., "Email Grouping and Summarization: An Unsupervised Learning Technique", In Proceedings of World Congress on Computer Science and Information Engineering vol. 5, Mar. 31, 2009, pp. 575-579.
Carenini, et al., "Scalable Discovery of Hidden Emails from Large Folders", In Proceedings of the Eleventh ACM SIGKDD International Conference on Knowledge Discovery in Data Mining, Aug. 21, 2005, 4 Pages.
Giacoletto, et al., "Automatic Expansion of Manual Email Classifications Based on Text Analysis", In Proceedings of International Conference on Ontologies, Databases and Applications of Semantics, Nov. 3, 2003, 18 Pages.
Greenstone, Scott, "Inbox by Gmail-Multiple Bundles", Retrieved From: http://www.scottgreenstone.com/2014/12/inbox-by-gmail-multiple-bundles.html, Dec. 23, 2014, 10 Pages.
Hachman, Mark, "Google in box is lousy; try it for yourself and see if you agree.", Retrieved From: http://www.greenbot.com/article/2877615/google-inbox-is-lousy-try-it-for-yourself-and-see-if-you-agree.html, Jan. 29, 2015, 5 Pages.
Munn, David, "Policy for managing email in the Greater London Authority", Retrieved From: https://www.london.gov.uk/moderngov/Data/Business%20Management%20and%20Administration%20Committee/20041201/Agenda/16%20Appendix%201%20PDF.pdf, Dec. 20, 2016, 15 Pages.
Muresan, et al., "Combining Linguistic and Machine Learning Techniques for Email Summarization", In Poceedings of Workshop on Computational Natural Language Learning, vol. 7, Jul. 6, 2001, 8 Pages.
Nguyen, Chuong, "Google Inbox's shareable Trip Bundles make it easier to coordinate travel.", Retrieved From: https://www.techradar.com/news/software/applications/google-inbox-s-shareable-trip-bundles-make-it-easier-to-coordinate-travel-1311158, Dec. 15, 2015, 10 Pages.
"International Search Report and Written Opinion Issued in PCT Application No. PCT/US2018/016781", dated Apr. 18, 2018, 13 Pages.
"International Search Report and Written Opinion Issued in PCT Application No. PCT/US2018/016782", dated May 15, 2018, 13 Pages.
"International Search Report & Written Opinion for PCT Application No. PCT/US2018/016783", dated Mar. 21, 2018, 11 Pages.
"International Search Report and Written Opinion Issued in PCT Application No. PCT/US2018/016784", dated Apr. 30, 2018, 12 Pages.
"International Search Report and Written Opinion Issued in PCT Application No. PCT/US2018/016785", dated Mar. 27, 2018, 10 Pages.
Phadke, Gautam, Swapna, "Email Classification Using A Self-Learning Technique Based on User Preferences", In Partial Fulfillment of the Requirements for the Degree of Master of Science, Master Thesis of North Dakota State University, Oct. 2015, 55 Pages.
Rennie, J., "ifile: An Application of Machine Learning to E-Mail Filtering", In Proceedings of Sixth ACM SIGKDD International Conference on Knowledge Discovery and Data Mining Workshop on Text Mining, Aug. 20, 2000, 6 Pages.
Russell, Eleanor, "Guidelines on Developing a Policy for Managing Email.", In National Archives, Jan. 2004, 8 Pages.
Smith, Lauren, "A First Look at Inbox by Gmail: What Email Marketers Need to Know", Retrieved From: https://litmus.com/blog/a-first-look-at-inbox-by-gmail-what-email-marketers-need-to-know, Oct. 24, 2014, 11 Pages.
Sorower, et al., "Improving Automated Email Tagging with Implicit Feedback", In Proceedings of 28th ACM Symposium on User Interface Software and Technology, Nov. 5, 2015, 11 Pages.
Standss, "Organizing Emails: Folders versus Tags", Retrieved From: http://www.standss.com/blog/index.php/organizing-emails-folders-tags/, Jan. 5, 2016, 7 Pages.

(56) References Cited

OTHER PUBLICATIONS

Tam, et al., "Automatic Foldering of Email Messages: a Combination Approach", In Proceedings of 34th European Conference on Advances in Information Retrieval., Apr. 1, 2012, 1 Page.

Thomas, et al., "Using a Sentence Compression Pipeline for the Summarization of Email Threads in An Archive", In Journal of Computer Sciences in Colleges, vol. 31, Issue 2, Dec. 1, 2015, 7 Pages.

Weverka, Peter, "Archiving Outlook Folders", Retrieved From: https://www.dummies.com/software/microsoft-office/outlook/archiving-outlook-folders/, Dec. 27, 2016, 3 Pages.

"Non Final Office Action Issued in U.S. Appl. No. 15/430,245", dated Feb. 19, 2020, 13 Pages.

"Non Final Office Action Issued in U.S. Appl. No. 15/430,270", dated Jan. 21, 2020, 27 Pages.

"Notice of Allowance Issued in U.S. Appl. No. 15/430,327", dated Oct. 24, 2019, 7 Pages.

"Final Office Action Issued in U.S. Appl. No. 15/430,245", dated Aug. 7, 2020, 16 Pages.

"Final Office Action Issued in U.S. Appl. No. 15/430,270", dated Jul. 10, 2020, 29 Pages.

"Notice of Allowance Issued in U.S. Appl. No. 15/430,245", dated Oct. 14, 2020, 10 Pages.

"Notice of Allowance Issued in U.S. Appl. No. 16/585,359", dated Sep. 9, 2020, 18 Pages.

\* cited by examiner

100

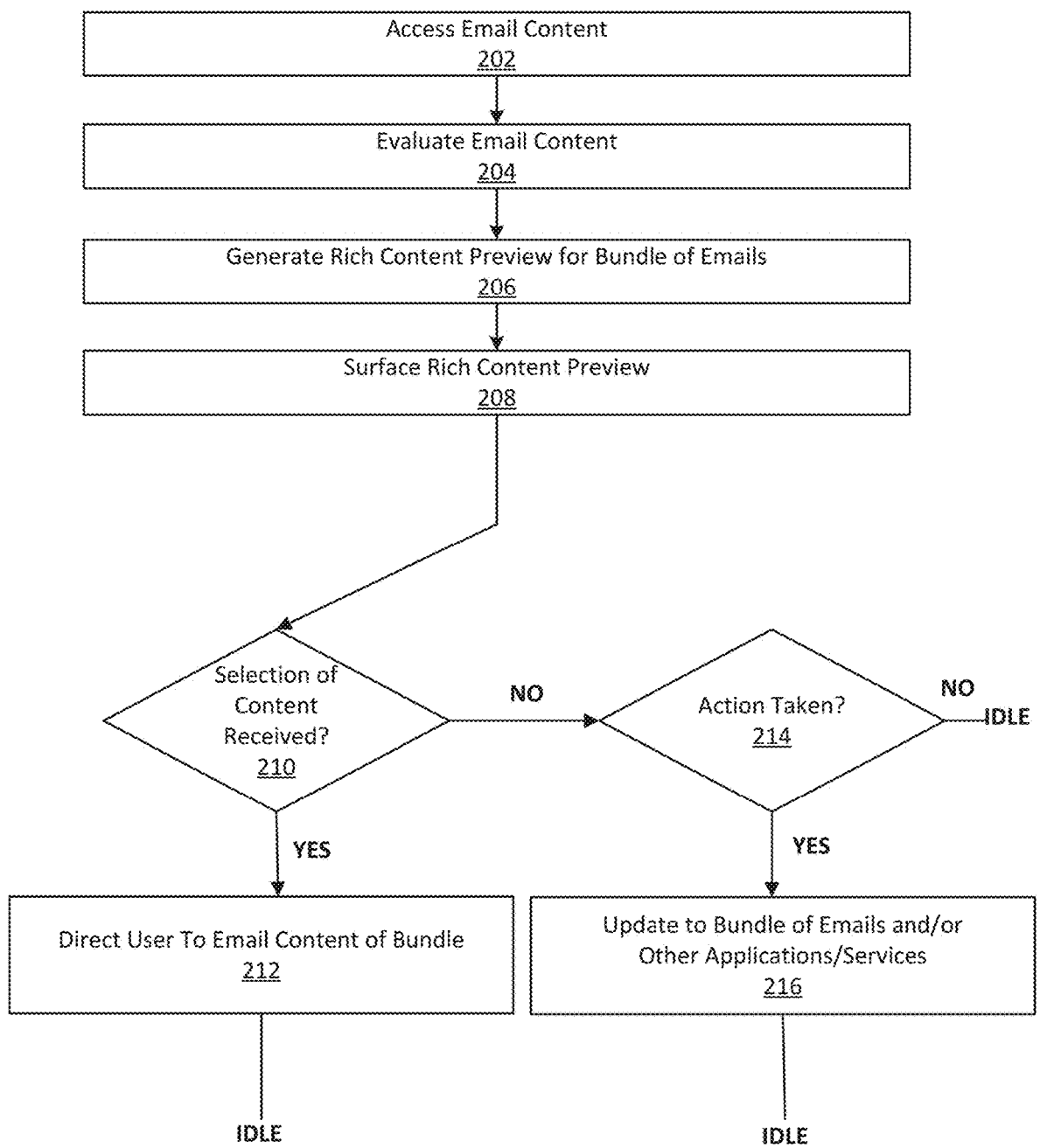

RICH PREVIEW OF BUNDLED CONTENT

BACKGROUND

Currently, the only mechanisms available to a user to group together like content is through folder creation or through the creation of a label. In one instance, traditional email clients allow a user to create a folder and move content into the folder. However, this folder is outside the inbox, thus demoting the importance of said messages. Further, the folder structure is everlasting and remains a fixture in a navigational pane of an email client, which can clog up a mailbox of a user. Folder structures can also complicate a user interface of an email client, especially when users access an email client through a mobile device, which has limited display space. Furthermore, limitations with folder structures exist when there are other users that content is to be shared with. With folder structures, the other users are required to manually access a folder and do not receive automatic content updates. In alternative instances a label can be created for management of content. However, labels work like folders and have the same issues as described above. Labels are not ephemeral, have sharing limitations and have the potential to clog up the user interface and mailbox history of an email client.

Moreover, email clients are currently limited in what is previewed in a preview of message content. For instance, email clients may provide previews that comprise media information at the message list level. However, these previews are not generated intelligently and simply display any links, images, or attachments found in the mail without giving any deference to the contextual relevancy. This results in a poor user experience.

As such, examples of the present application are directed to the general technical environment related to improving operation of an email service, where processing efficiency and usability are improved, among technical benefits.

SUMMARY

Non-limiting examples describe automated management of rich content previews associated with bundled content of an application/service. As an example, a bundle of content may be a bundle of emails created within an email service. Email content associated with a bundle of emails may be accessed. The bundle of emails may comprise: a grouping of at least two separate email threads and a tag associating the at least two email threads. The email content may be evaluated based on application of machine learning model that: determines an entity type associated with the bundle of emails based on the tag, identifies a state associated with the bundle of emails, and determines relevancy of specific email content in association with a determined entity type and the identified state associated with the bundle of emails. A rich content preview for the bundle of emails may be generated based on an evaluation of the email content. As an example, the rich content preview may comprise two or more portions of content extracted from the bundle of emails based on a relevancy determination of the specific email content and one or more actionable links generated based on a determined state associated with the bundle of emails. In further examples, a generated rich content preview for a bundle of emails may be surfaced inline within a mailbox of an email service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2 is an exemplary method related to management of rich content previews for bundled content with which aspects of the present disclosure may be practiced.

DETAILED DESCRIPTION

Non-limiting examples of the present disclosure describe automated management of rich content previews associated with bundled content of an application/service. As an example, a bundle of content may be a bundle of emails created within an email service. User interface functionality for automated generation and providing of exemplary rich content previews of bundled content is described herein. Other aspects related to management of bundled content may be provided in related co-pending applications. While some examples may reference bundled content, it should be recognized that processing operations described herein are applicable to any type of message content (including individual message content).

Figure 1:
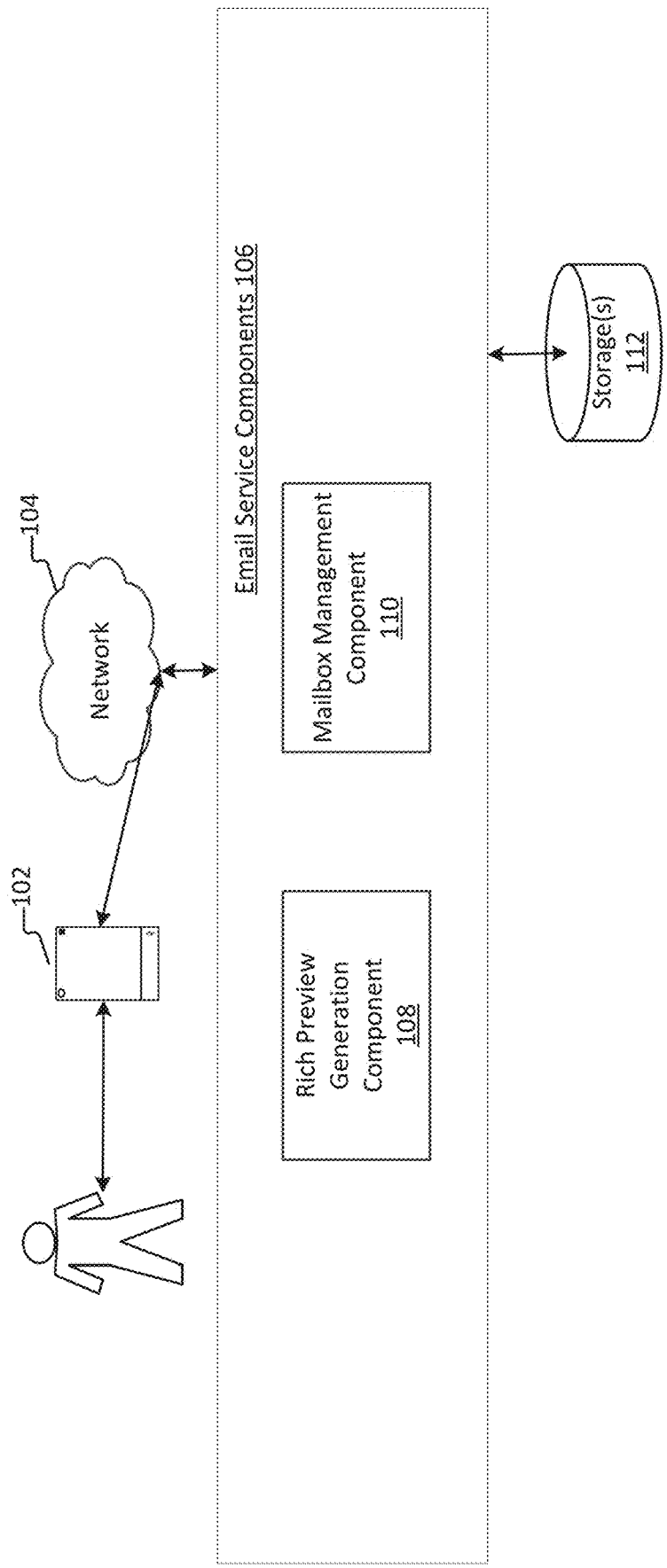
FIG. 1 illustrates an exemplary system implementable on one or more computing devices on which aspects of the present disclosure may be practiced.

FIG. 1 illustrates an exemplary system 100 implementable on one or more computing devices on which aspects of the present disclosure may be practiced. System 100 may be an exemplary system for execution of an email service with which aspects of the present disclosure may be practiced. Components of system 100 may be hardware components or software implemented on and/or executed by hardware components. In examples, system 100 may include any of hardware components (e.g., ASIC, other devices used to execute/run an OS, and software components (e.g., applications, application programming interfaces, modules, virtual machines, runtime libraries) running on hardware. In one example, an exemplary system 100 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be executed on a processing device such as a computer, mobile device (e.g., smartphone/phone, tablet) and/or any other type of electronic devices. As an example of a processing device operating environment, refer to operating environments of FIGS. 4-6. One or more components of system 100 may be configured to execute any of the processing operations described in at least method 200 described in the description of FIG. 2. In other examples, the components of systems disclosed herein may be spread across multiple devices. Exemplary system 100 comprises email service components 106 that further comprise: a rich preview generation component 108 and a mailbox management component 110.

One or more data stores/storages or other memory may be associated with system 100. For example, a component of system 100 may have one or more data storage(s) 112 (described below) associated therewith. Data associated with a component of system 100 may be stored thereon as well as processing operations/instructions executed by a component of system 100. Furthermore, it is presented that application components of system 100 may interface with other application services. Application services may be provided as platform resources referenced in the foregoing. Application services may be any resource that may extend functionality of one or more components of system 100. Application services may include but are not limited to: personal intelligent assistant services, web search services, e-mail applications, word processing applications, spreadsheet applications, presentation applications, notes applications, calendaring applications, device management services, address book services, informational services, line-of-business (LOB) management services, customer relationship management (CRM) services, debugging services, accounting services, payroll services and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 100.

System 100 may comprise one or more storage(s) 112 that may store data associated with operation of one or more components of system 100. In examples, storage(s) 112 may interface with other components of system 100. Data associated with any component of system 100 may be stored in storage(s) 112, where components may be connected to storage(s) 112 over a distributed network including cloud computing platforms and infrastructure services. Exemplary storage(s) 112 may be any of a first-party source, a second-party source, and a third-party source. Storage(s) 112 are any physical or virtual memory space. Storage(s) 112 may store any data for processing operations performed by components of system 100, retained data from processing operations, stored programs, code or application programming interfaces (APIs), training data, links to resources internal and external to system 100 and knowledge data among other examples. Furthermore, in examples, components of system 100 may utilize knowledge data in processing by components of system 100. Knowledge may be used by one or more components of system 100 to improve processing of any of the email service components 106 where knowledge data can be obtained from resources internal or external to system 100. In examples, knowledge data may be maintained in storage(s) 112 or retrieved from one or more resources external to system 100 by knowledge fetch operation.

In FIG. 1, processing device 102 may be any device comprising at least one processor and at least one memory/storage. Examples of processing device 102 may include but are not limited to: processing devices such as desktop computers, servers, phones, tablets, phablets, slates, laptops, watches, and any other collection of electrical components such as devices having one or more processors or circuits. In one example processing device 102 may be a device of a user that is executing applications/services such as an exemplary email service (e.g. email client). An example of an email service is Outlook®. In examples, processing device 102 may communicate with the email service components 106 via a network 104. In one aspect, network 104 is a distributed computing network, such as the Internet. Email service components 106 may also communicate with application services via the network 104. Processing device 102 may be a device as described in the description of FIGS. 4-6. In some examples, processing device 102 may comprise multiple connected devices. Processing device 102 is an example of a user computing device.

The processing device 102 may execute processing operations that include an ability to access an application/service through a user account. In one example, processing device 102 may connect an authenticated user to an exemplary application/service that stores user data for one or more users of the application/service. For example, a user, utilizing processing device 102, may access an email service, where the email service may authenticate a user account of the user. The email service may access a mailbox management component 110 (of the email service components 106) to provide, to the processing device 102, a representation of a mailbox (of the email service) that is associated with the user account of the user.

An exemplary storage application/service may provide a user of processing device 102 with access to data stored in an exemplary data center. In one example, processing device 102 may be connected with storage(s) 112 via a distributed network, which may provide users with access to user data. One or more tenant resources (e.g. Tenant Resource A, Tenant Resource B, Tenant Resource C, etc.) may be associated with processing device 102. A tenant resource may be a user account associated with a processing device and/or distributed network service. Data associated with a tenant resource may be stored on storage(s) 112, where a tenant account can be utilized to access stored data by processing device 102 and/or other processing devices. Email service components 106 are components configured to execute processing operations to management of message content associated with a user mailbox of an email service. The email service components 106 are executed by one or more computing devices. An exemplary computing device may comprise one or more processors and memory, among other components. Examples of computing devices are provided in the description of at least FIGS. 4-6. As referenced above, the email service components 106 comprise: a rich preview generation component 108 and a mailbox management component 110.

The rich preview generation component 108 is configured to generate rich content previews for bundles of content. For example, the rich preview generation component 108 may generate a rich content preview for a bundle of emails created through an exemplary email service. Traditional email services may generate previews of email content at a message list level. However, these previews are not generated intelligently and simply extract and display any type of content from an email without contemplating the relevance of the content to the user. For instance, a traditional email service may extract any type of link, images, attachments, images of signature blocks, etc., found in the mail regardless of how relevant the content is to the user. This can result in a poor user experience for the user, where a message preview is more of a hindrance to the user as the user is likely to disregard such a preview. In the present disclosure, the rich preview generation component 108 is configured to enhance preview generation for emails, for example, by generating a contextually relevant rich content preview for an exemplary bundle of emails. An example of a rich content preview is provided in FIG. 3A. Furthermore, exemplary rich content previews are actionable, where users can take action with respect to a bundle of emails without having to directly access a specific email of the bundle.

An exemplary rich content preview may be generated for message content of an application/service. Message content may comprise bundled message content. Custom bundles (e.g. bundles of emails) may be created either by a user or by an email service on behalf of a user. Custom bundles are a light-weight mechanism for managing associations between content (e.g. emails where a bundle of emails may be created). A bundle can be defined as an automatic of manually set grouping of like items. As an example, a bundle may be created to group two or more email messages of an email service, creating a bundle of emails. An exemplary bundle of emails may comprise a grouping of at least two separate email threads. The bundle of emails may further comprise an exemplary tag, providing an association to an entity type tagging structure. An exemplary entity type tagging structure can be utilized to classify emails of an email service including bundled emails. Data associated with the entity type tagging structure (including an exemplary tag) can be used to assist with searching and filtering of email data including bundles of emails. Further examples may reference exemplary tags in relation to bundled content. However, exemplary tags (and other data of an entity type tagging structure) may be associated with individual message content as well as bundles message content.

An exemplary tag is further used to associate email messages and content of the bundle (e.g. bundle of emails). The tag associates an email message (and/or other content) with one or more additional email (and/or other content). In one example, an exemplary tag is a hashtag. However, tags are not limited to such a form. Created tags become entity values that can be used to efficiently associate emails of a bundle. Tags further become entity data that can be used to prioritize searching and retrieval of created bundles. In some instances, tags may remain associated with a bundle even when a message is separated from a bundle. This may assist users with being able to quickly relocate an email during a subsequent search. In alternative examples, an email that was previously associated with a bundle and later removed may not retain an association to an exemplary tag.

Message content may be tagged with a name/tag ID as part of an entity type tagging infrastructure. In one example, an entity type tagging infrastructure may be used for the assignment and management of tags associated with message content (e.g. bundles of emails). That is, an entity type tagging structure may be generated for specific emails included in a bundle of emails. The entity type tagging structure may comprise a plurality of fields that are configured by developers, where data of the entity type tagging infrastructure can be utilized for management of content associated with a bundle including searching and filtering of bundles of content and sharing of bundled content. Attributes and fields associated with an exemplary entity type tagging infrastructure may vary based on the type of email content. In further examples, an entity type tagging infrastructure may be used for classification of any type of emails including emails not included in a bundle of emails as data from an entity type tagging infrastructure may be utilized to increase accuracy in classifying emails as a specific type or category. Examples of data fields that may be included in an exemplary entity type tagging infrastructure comprise but are not limited to: context fields pertaining to specific data of an email, tag/hashtag fields, email type fields, category fields, entity data fields, data source fields, date/timestamp information, hyperlink data fields, domain information fields, formatting/arrangement fields, confidence scores pertaining to classification and specific attributes of an email, data pertaining to specific email content and user triage action history with respect to specific messages (e.g. emails) and/or a category/type for the specific message, among other examples.

In examples where message content comprises an exemplary bundle of content, it is noted that bundling of content is contextually relevant and presented inline with other message content of an existing email experience. An email service is configured to create bundles of content on behalf of a user based on meaningful categories for the user/groups of users. This is a better solution than folders, labels or setting of email rules because a created bundle is ephemeral in nature. Bookmarked links such as folders/labels are not required to be created within a navigational pane of a user interface of an email service. Further, bundled content is automatically updated and intelligently managed by an email service, where bundled content can be automatically updated based on changes to message content associated with a user mailbox. If the topic item becomes irrelevant, a bundle would drop off (e.g. de-prioritize), but the bundle structure would still remain intact allowing for a bundle to be found later without requiring a physical link to be created and managed within a navigational pane of an email service (i.e. as with folders/labels). If a bundle receives a new message or update that may be relevant to a user (e.g. meeting appointment, tracking of shipment, notification, etc.), the bundle would be prioritized in a mailbox of a user. Notably, once a bundle is created in an email service, subsequent email messages from bundled message threads may result in update to the created bundle, where a user would not have to go looking for individual messages/message threads.

The rich preview generation component 108 generates an exemplary rich content preview by applying a machine learning model that is configured to analyze different aspects associated with a bundle of emails to identify contextually relevant content for a user. The machine learning model employed by the rich preview generation component 116 is configured to identify key content to extract from a bundle of emails and surface they key content in a message preview of the bundle of emails. An exemplary rich content preview may be actionable, where UI features are provided to enable the user to take action with respect to a bundle of emails without even opening an email of the bundle of emails. For example, a user may receive an email from their dentist asking the user to confirm their appointment time through visiting a link. Application of the machine learning model by the rich preview generation component 108 may extract the link and surface it as a rich content preview, thus allowing the user to confirm their appointment without even opening an email.

In generating an exemplary rich content preview, the rich preview generation component 108 may access email content associated with a bundle of emails. The rich preview generation component 108 is configured to apply an exemplary machine learning model to evaluate email content associated with the bundle of emails. Different aspects associated with a bundle of emails may be evaluated to determine specific content from a bundle of emails that may be most contextually relevant to a user.

An applied machine learning model may be configured to determine an entity type associated with the bundle of emails. In doing so, exemplary tags associated with the bundle of emails are evaluated. For example, an exemplary tag may be associated with one or more entity type tagging infrastructures of a bundle of emails. Modeling may utilize an exemplary tag to identify and evaluate exemplary entity type tagging infrastructures associated with a bundle of emails. As an example, a tag may be associated with travel (e.g. #travel) that comprises trip information for a vacation of a user. An exemplary machine learning model may confirm an entity type classification of travel through evaluation of an exemplary entity type tagging infrastructure for a bundle of emails.

Furthermore, an applied machine learning model may be configured to identify a state associated with the bundle of emails. A state may be determined based on evaluation of any attributes associating user specific actions with a bundle of emails. Attributes evaluated to determine a state of a bundle of emails comprises but is not limited to: whether email content of the bundle is read/unread, whether specific content has been previously viewed by a user (e.g. seen/unseen), a determination as to how recent specific email content may be and time sensitivity associated with specific email content of a bundle, among other examples. Attributes for identifying a state associated with the bundle of emails are useful in assisting the machine learning model in not only evaluating the relevancy of specific message content but also determining presentation of an exemplary rich content preview. For instance, presentation of a rich content may vary based on an identified state associated with content of the bundle of emails where a state may impact: an amount of content to include in a rich content preview, formatting/bolding associated with the rich content preview, whether UI notifications/callouts are attached to a rich content preview and specific links that are included in a rich content preview, among other examples.

Moreover, an applied machine learning model may be configured to determine relevancy of specific email content of the bundle of emails. Relevancy of specific email content may be determined in association with the determined entity type and an identified state of the bundle of emails. Content and metadata associated with the bundle of emails may be evaluated for relevancy where some content may be more contextually relevant than other content from the bundle of emails. For example, an entity type for a bundle of emails may be determined to be travel for a trip to Mexico, where specific content related to booking reservations, contact information, messages from travel companions regarding trip planning, etc. may be identified as being most relevant to a user. Among other examples, the machine learning model may apply a classifier to evaluate different feature aspects and generate a ranking for relevancy of specific message content. Generation and application of an exemplary classifier for deterministic evaluation is known to one skilled in the art. Message content that is determined to be most relevant can be based on any number of factors but weighting may be skewed to more strongly consider the determined entity type and the identified state. In some examples, size and presentation of an exemplary rich content preview may vary based on a modeling evaluation of the bundle of emails. In other examples, developers may set a fixed size for generated rich content previews, for example, to account for mailbox space of a mailbox of a user account.

The rich preview generation component 108 may generate an exemplary rich content preview based on evaluation of the email content (e.g. by an exemplary machine learning model). As identified above, an exemplary rich content preview may be tailored to a user, where content included within the rich content preview may be specific to a user or group users. An exemplary rich content preview may be a rich media object that comprises a collection of different forms of content for a user. An exemplary rich content preview may include content in any form including but not limited to: text, images, audio, handwritten input, streaming content and links/hyperlinks, among other examples. An illustrative example of a rich content preview 304 is provided in FIG. 3A. The rich content preview may comprise two or more portions of content extracted from the bundle of emails based on a relevancy determination of the specific email content.

As an example, the two or more portions of content of the rich content preview may comprise summary information for the bundle of emails. Summary information may be a collection of information that is determined to be pertinent to a user based on the determined entity type of the bundle of emails. Content included as summary information as well as presentation and arrangement of such content may vary based on a determined entity type. In further examples, portions of content of the rich content preview may comprise image content extracted from the bundle of emails. Image content selected for inclusion within an exemplary rich content preview may vary based a relevancy evaluation of the specific email content in association with the determined entity type.

Further, an exemplary rich content preview may comprise one or more actionable links generated based on a determined state associated with the bundle of emails. As identified above, an exemplary rich content preview may be actionable, where UI features are provided to enable the user to take action with respect to a bundle of emails without even opening an email of the bundle of emails. For example, a user may receive an email from their dentist asking the user to confirm their appointment time through visiting a link. Application of the machine learning model by the rich preview generation component 108 may extract the link and surface it as a rich content preview, thus allowing the user to confirm their appointment without even opening an email. In some examples, actionable links may be extracted from content of a bundle of emails. In other examples, evaluation of the bundle of emails may make a determination to create/generate an actionable link for a user based evaluation of message content of a bundle of emails through application of an exemplary machine learning model. In creating a new actionable link, the rich preview generation component 108 may interface with other application services (e.g. associated with a platform that comprises a suite of applications or third-party resources) to enable actionable links to be created.

Moreover, an exemplary rich content preview may further comprise user interface features for management of the bundle of emails. As an example, said interface features enable action to be taken for the bundle of emails without requiring specific emails of the bundle of emails to be accessed. In one example, users can perform actions (e.g. in bulk) on the bundles, such as mark as read, delete, and pin (e.g. pin content to other content or specific applications/services).

An exemplary rich content preview may be presented inline within a representation of an email service. For instance, the rich content preview may be presented inline with other emails of mailbox of a user. Further, an exemplary rich content preview may be configured to enable a user to select specific portions of the rich content preview. For instance, a selection of a first portion of content from the rich content preview may be received through a UI of an email service. As an example, the received selection may result in the email service directing the user to a specific email of the bundle of emails. In other examples, a selection of a portion of an exemplary rich content preview may direct users to a specific email based on an identified state associated with the bundle of emails. For example, selection of a portion of a rich content preview may direct the user to view a most recent unread email associated with the bundle of emails.

In some examples, multiple different rich content previews may be generated for a bundle of emails. Rich content previews may also change over time as a bundle of emails evolves. For instance, an exemplary rich content preview may be dynamically updated based on addition/removal of content to a bundle of emails, changes to a state of an email, new upcoming appointments/calendared meetings, etc.

The mailbox management component 110 is a component configured to manage email data associated with a user account of an email service and provide a representation of a mailbox (of the email service) that is associated with the user account of the user. The mailbox management component 110 may retrieve email data associated with the user account and generate a representation of a mailbox for the user. An exemplary representation of the mailbox may be provided through an email service (e.g. executing on a processing device such as processing device 102). Generation of a representation of a mailbox of a user is known to one skilled in the art. Moreover, the mailbox management component 110 may interface with the rich preview generation component 108 to enable generation of exemplary rich content previews for message content. For instance, data associated with a generated rich content preview may be passed to the mailbox management component 110, which may provide an exemplary rich content preview in a representation of a user mailbox (of the email service).

FIG. 2 is an exemplary method 200 related to management of rich content previews for bundled content with which aspects of the present disclosure may be practiced. As an example, method 200 may be executed by an exemplary processing device and/or system such as those shown in FIGS. 4-6. In examples, method 200 may execute on a device comprising at least one processor configured to store and execute operations, programs or instructions. Operations performed in method 200 may correspond to operations executed by a system and/or service that execute computer programs, application programming interfaces (APIs), neural networks or machine-learning processing, among other examples. As an example, processing operations executed in method 200 may be performed by one or more hardware components. In another example, processing operations executed in method 200 may be performed by one or more software components. In some examples, processing operations described in method 200 may be executed by one or more applications/services associated with a web service that has access to a plurality of applications/services, devices, knowledge resources, etc. Processing operations described in method 200 may be implemented by one or more components connected over a distributed network, for example, as described in system 100 (of FIG. 1).

Method 200 begins at processing operation 202, where email content associated with a user account of an email service may be accessed. Exemplary email content may pertain to emails for a user account of the email service. Email content may be accessed (processing operation 202) with user consent in accordance with policies outlined for application/service usage for an email service and/or suite of applications of a specific platform. In one example, email content associated with an exemplary bundle of emails may be accessed in processing operation 202. The bundle of emails may comprise: a grouping of at least two separate email threads and a tag associating emails of the grouping.

Flow may proceed to processing operation 204, where the email content may be evaluated based on application of machine learning model. Examples related to application of a machine learning model to evaluate a bundle of emails is described in the description of the rich preview generation component 108 (of FIG. 1).

In processing operation 204, an applied machine learning model may be configured to determine an entity type associated with the bundle of emails. In doing so, exemplary tags associated with the bundle of emails are evaluated. For example, an exemplary tag may be associated with one or more entity type tagging infrastructures of a bundle of emails. Modeling may utilize an exemplary tag to identify and evaluate exemplary entity type tagging infrastructures associated with a bundle of emails. As an example, a tag may be associated with travel (e.g. #travel) that comprises trip information for a vacation of a user. An exemplary machine learning model may confirm an entity type classification of travel through evaluation of an exemplary entity type tagging infrastructure for a bundle of emails.

Furthermore, an applied machine learning model may be configured to identify a state associated with the bundle of emails. A state may be determined based on evaluation of any attributes associating user specific actions with a bundle of emails. Attributes evaluated to determine a state of a bundle of emails comprises but is not limited to: whether email content of the bundle is read/unread, whether specific content has been previously viewed by a user (e.g. seen/unseen), a determination as to how recent specific email content may be and time sensitivity associated with specific email content of a bundle, among other examples. Attributes for identifying a state associated with the bundle of emails are useful in assisting the machine learning model in not only evaluating the relevancy of specific message content but also determining presentation of an exemplary rich content preview. For instance, presentation of a rich content may vary based on an identified state associated with content of the bundle of emails where a state may impact: an amount of content to include in a rich content preview, formatting/bolding associated with the rich content preview, whether UI notifications/callouts are attached to a rich content preview and specific links that are included in a rich content preview, among other examples.

Moreover, an applied machine learning model may be configured to determine relevancy of specific email content of the bundle of emails. Relevancy of specific email content may be determined in association with the determined entity type and an identified state of the bundle of emails. Content and metadata associated with the bundle of emails may be evaluated for relevancy where some content may be more contextually relevant than other content from the bundle of emails. For example, an entity type for a bundle of emails may be determined to be travel for a trip to Mexico, where specific content related to booking reservations, contact information, messages from travel companions regarding trip planning, etc. may be identified as being most relevant to a user. Among other examples, the machine learning model may apply a classifier to evaluate different feature aspects and generate a ranking for relevancy of specific message content.

Flow may proceed to processing operation 206, where an exemplary rich content preview based is generated based on evaluation of the email content. As identified above, an exemplary rich content preview may be tailored to a user, where content included within the rich content preview may be specific to a user or group users. An exemplary rich content preview may be a rich media object that comprises a collection of different forms of content for a user. An exemplary rich content preview may include content in any form including but not limited to: text, images, audio, handwritten input, streaming content and links/hyperlinks, among other examples. An illustrative example of a rich content preview 304 is provided in FIG. 3A. The rich content preview may comprise two or more portions of content extracted from the bundle of emails based on a relevancy determination of the specific email content. However, in alternative examples, content included in a rich content preview may vary.

As an example, the two or more portions of content of the rich content preview may comprise summary information for the bundle of emails. Summary information may be a collection of information that is determined to be pertinent to a user based on the determined entity type of the bundle of emails. Content included as summary information as well as presentation and arrangement of such content may vary based on a determined entity type. In further examples, portions of content of the rich content preview may comprise image content extracted from the bundle of emails. Image content selected for inclusion within an exemplary rich content preview may vary based a relevancy evaluation of the specific email content in association with the determined entity type.

Further, an exemplary rich content preview may comprise one or more actionable links generated based on a determined state associated with the bundle of emails. As identified above, an exemplary rich content preview may be actionable, where UI features are provided to enable the user to take action with respect to a bundle of emails without even opening an email of the bundle of emails. In some examples, actionable links may be extracted from content of a bundle of emails. In other examples, evaluation of the bundle of emails may make a determination to create/generate an actionable link for a user based evaluation of message content of a bundle of emails through application of an exemplary machine learning model.

Moreover, an exemplary rich content preview may further comprise user interface features for management of the bundle of emails. As an example, said interface features enable action to be taken for the bundle of emails without requiring specific emails of the bundle of emails to be accessed. In one example, users can perform actions (e.g. in bulk) on the bundles, such as mark as read, delete, and pin (e.g. pin content to other content or specific applications/services). A generated rich content preview may be surfaced (processing operation 208) within an email service. As an example, an exemplary rich content preview for a bundle of emails may be surfaced (processing operation 208) inline within a mailbox of an email service.

In some examples, a user may access the bundle of emails through selection of content associated with an exemplary rich content preview. Flow may proceed to decision operation 210, where it is determined whether a selection is made for content of a rich content preview that may trigger access to the bundle of emails. In examples where a user selects content associated with a rich content preview to trigger access to the bundle of emails, flow branches YES and proceeds to processing operation 212. At processing operation 212, an email service may direct a user to content associated with the bundle of emails. In one example, selection of a specific portion of the rich content preview may result in the user being directed to specific email content of the bundle of emails. In alternative examples, a selection associated with a rich content preview may direct a user to a most recent email of the bundle of emails. In any example, UI functionality of an email service is configured to enable a user to navigate content (e.g. emails) associated with the bundle of emails.

In examples where no selection occurs triggering access to the bundle of emails, decision operation 210 branches NO and flow proceeds to decision operation 214. At decision operation 214, it is determined whether action is taken with respect to a link associated with a rich content preview. If no action is detected, flow branches NO and processing of method 200 remains idle. If an action is detected, flow branches YES and processing of method 200 proceeds to processing operation 216.

At processing operation 216, update may occur to one or more of the bundle of emails and/or other applications/services that may be associated with an actionable link. For example, a rich content preview may provide a link to confirm a meeting with a client (that was previously unconfirmed). This may trigger update to both the bundle of emails (where the meeting is confirmed) as well as a calendaring application/service that manages a calendar for a user (where the meeting may also be confirmed). In some examples, an exemplary rich content preview may be dynamically updated based on changes to the bundle of emails. In alternative examples, exemplary rich content previews may be generated for a bundle of emails upon refresh of a mailbox of a user.

Figure 3A:
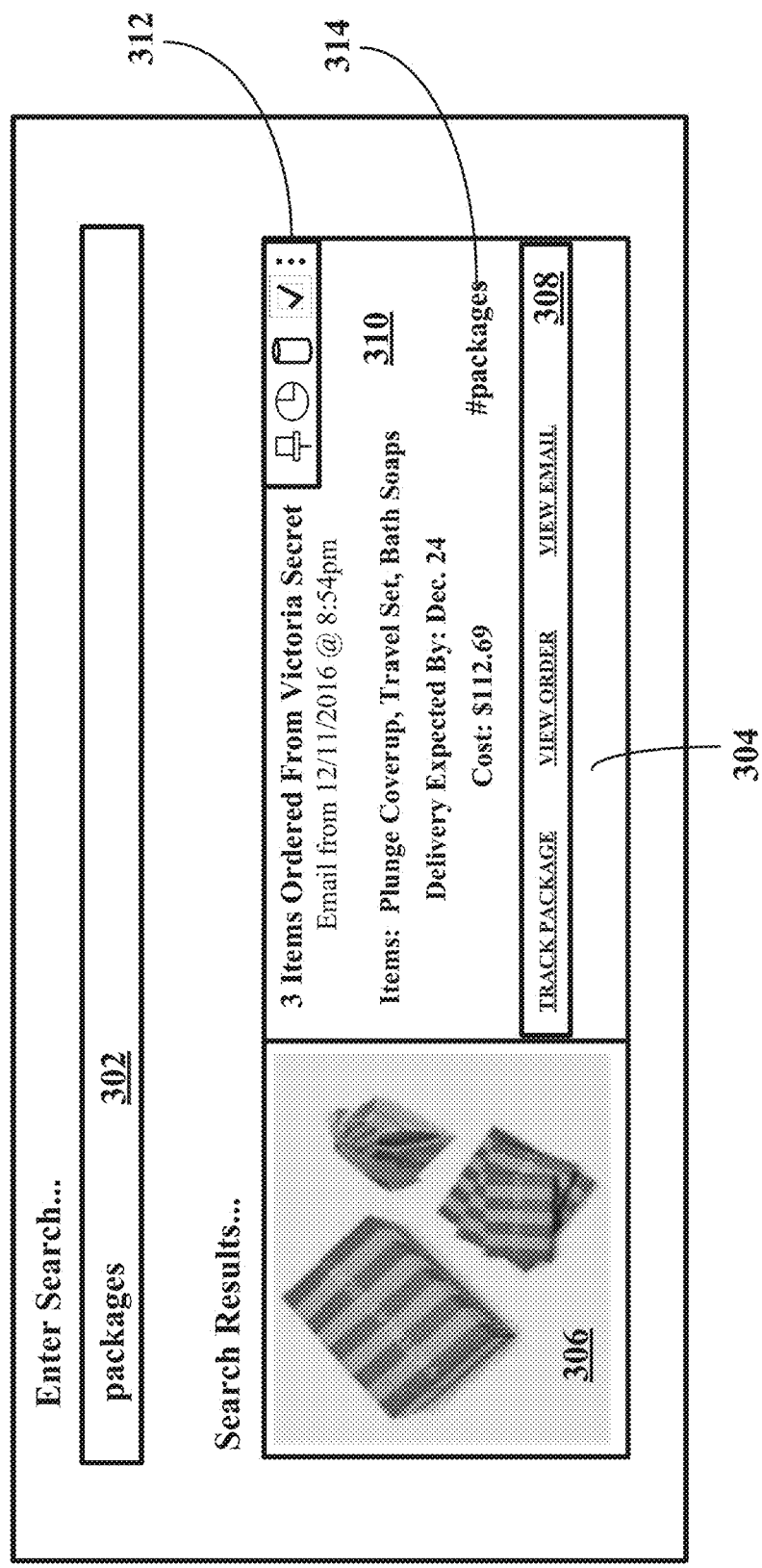
FIGS. 3A provides a user interface view illustrating user interface examples for a rich content preview of bundled content, with which aspects of the present disclosure may be practiced.

FIG. 3A provides a user interface view 300 illustrating user interface examples for a rich content preview of bundled content, with which aspects of the present disclosure may be practiced. User interface view 300 provides illustration of an exemplary rich content preview for a bundle of emails. Processing operations related to generation of an exemplary rich content preview are described in at least the description of the rich preview generation component 108 of FIG. 1. As shown in user interface view 300, a user enters a search query of "packages" into a search field 302. A search result associated with an exemplary tag "#packages" is prioritized in the returned search results, where a rich content preview 304 of a bundle of emails (associated with #packages) is displayed.

As an example, the bundle of emails may be associated with three purchases made from Victoria's Secret®. The rich content preview 304 may comprise image content 306. The image content 306 displayed in the rich content preview 304 may be tailored specifically to the content ordered/shipment of the packages. The rich content preview 304 may further comprise summary information 310 pertaining to the bundle of emails that is tailored to provide information related to the purchases and tracking of the packages. Additionally, the rich content preview 304 may further comprise one or more actionable links 308 (e.g. track package, view order, view email) for the user to select without requiring the user to access specific emails in the bundle of emails. Moreover, the rich content preview 304 may further comprise UI features 312 to enable additional actions to be taken for the bundle of emails without requiring specific emails of the bundle of emails to be accessed. In one example, users can perform actions (e.g. in bulk) on the bundles, such as mark as read, delete, and pin (e.g. pin content to other content or specific applications/services). In some examples, an exemplary rich content preview may further comprise display of an exemplary tag associated with bundled content. As shown in rich content preview 304, a tag 314 (e.g. #packages) associated with a bundle of emails is provided. As an example, tag 314 may be a selectable UI link, for example, where a selection may trigger any of: direct access to email content associated with the tag, a view of entity data associated with the tag and UI features for additional actions with respect to the tag/content associated with the tag (e.g. sharing of bundled content).

Figure 4:
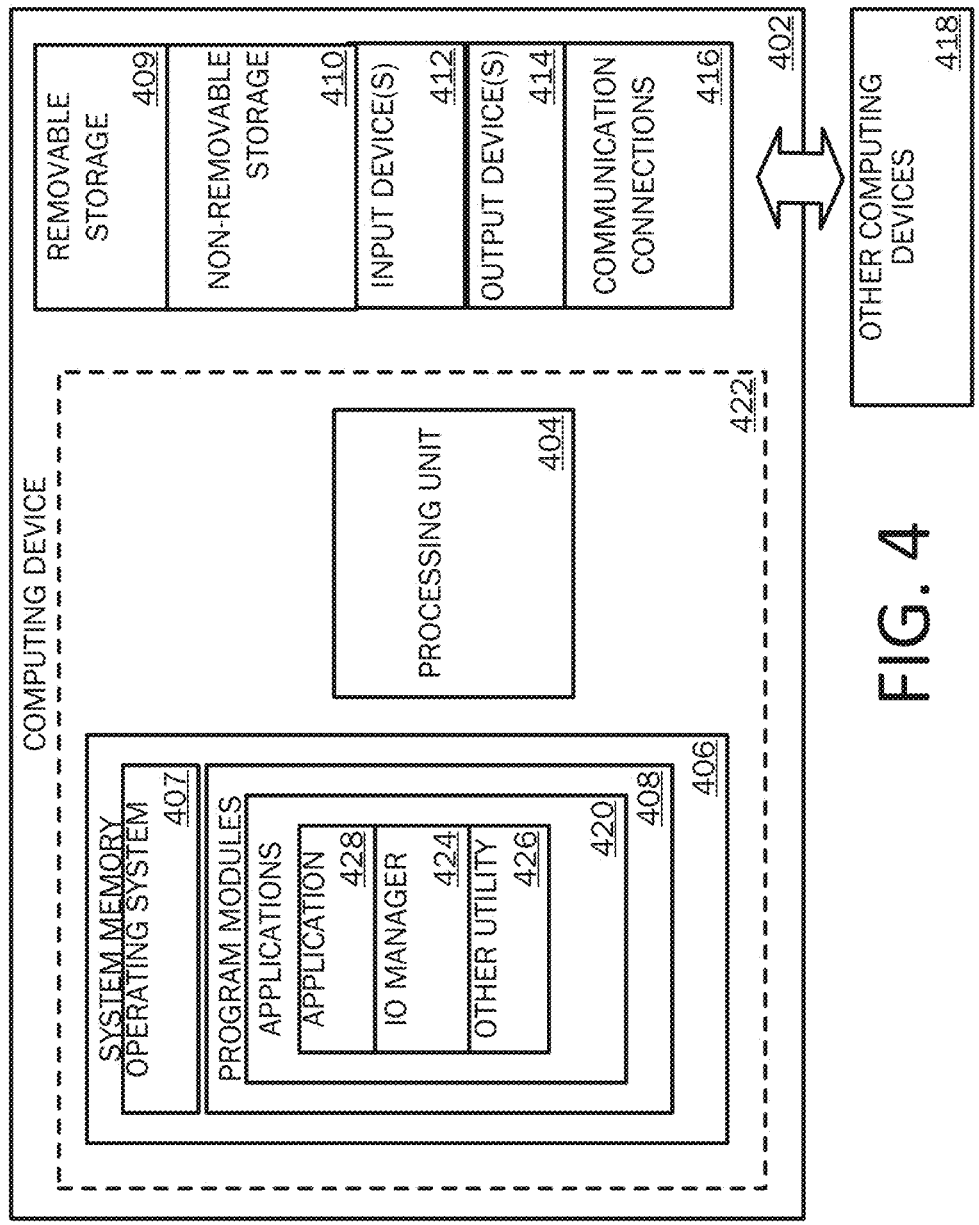
FIG. 4 is a block diagram illustrating an example of a computing device with which aspects of the present disclosure may be practiced.
Figure 5A:
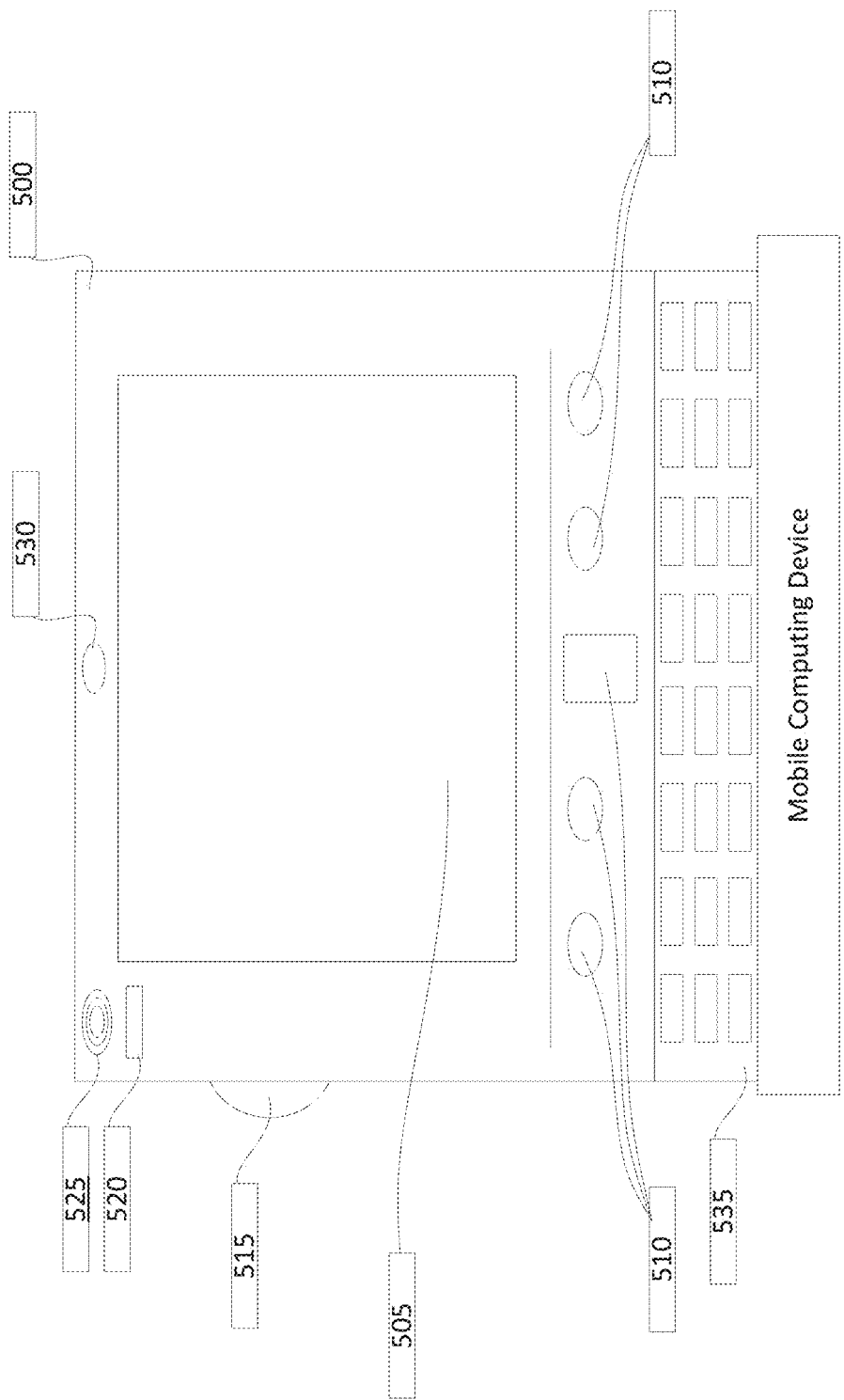
FIGS. 5A and 5B are simplified block diagrams of a mobile computing device with which aspects of the present disclosure may be practiced.
Figure 5B:
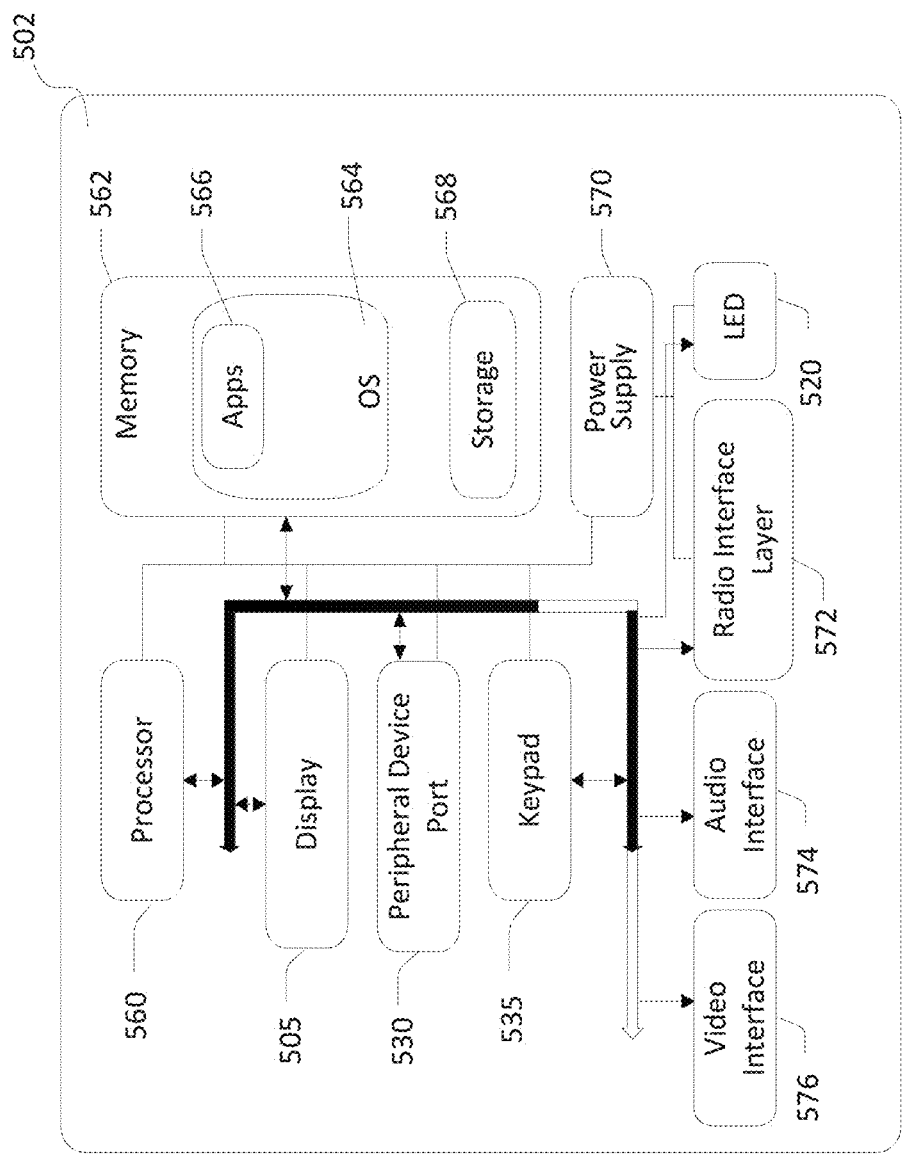
Figure 6:
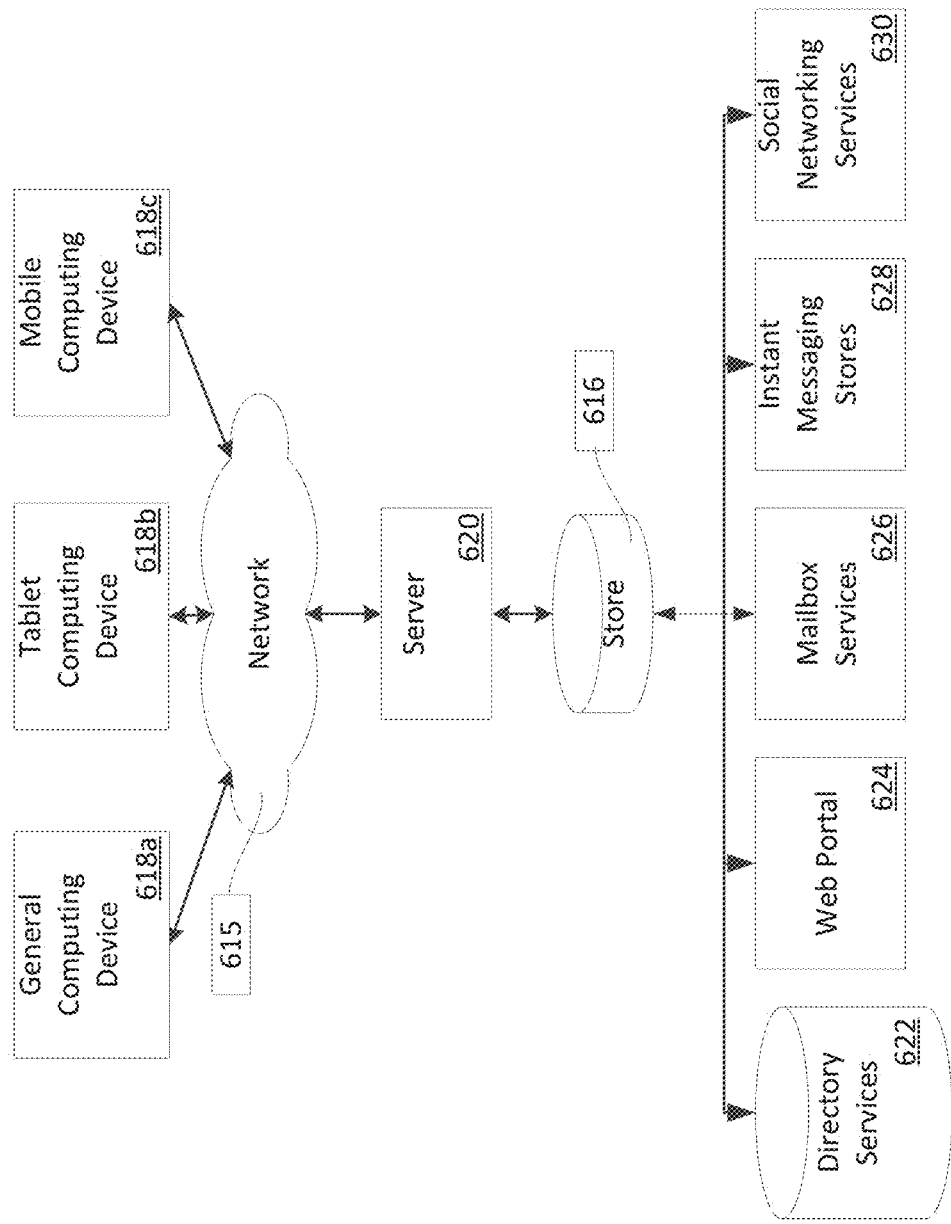
FIG. 6 is a simplified block diagram of a distributed computing system in which aspects of the present disclosure may be practiced.

FIGS. 4-6 and the associated descriptions provide a discussion of a variety of operating environments in which examples of the invention may be practiced. However, the devices and systems illustrated and discussed with respect to FIGS. 4-6 are for purposes of example and illustration and are not limiting of a vast number of computing device configurations that may be utilized for practicing examples of the invention, described herein.

FIG. 4 is a block diagram illustrating physical components of a computing device 402, for example a mobile processing device, with which examples of the present disclosure may be practiced. Among other examples, computing device 402 may be an exemplary computing device configured for execution of an email service as described herein. In a basic configuration, the computing device 402 may include at least one processing unit 404 and a system memory 406. Depending on the configuration and type of computing device, the system memory 406 may comprise, but is not limited to, volatile storage (e.g., random access memory), non-volatile storage (e.g., read-only memory), flash memory, or any combination of such memories. The system memory 406 may include an operating system 407 and one or more program modules 408 suitable for running software programs/modules 420 such as IO manager 424, other utility 426 and application 428. As examples, system memory 406 may store instructions for execution. Other examples of system memory 406 may store data associated with applications. The operating system 407, for example, may be suitable for controlling the operation of the computing device 402. Furthermore, examples of the invention may be practiced in conjunction with a graphics library, other operating systems, or any other application program and is not limited to any particular application or system. This basic configuration is illustrated in FIG. 4 by those components within a dashed line 422. The computing device 402 may have additional features or functionality. For example, the computing device 402 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 406. While executing on the processing unit 404, program modules 408 (e.g., Input/Output (I/O) manager 424, other utility 426 and application 428) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 402 may also have one or more input device(s) 412 such as a keyboard, a mouse, a pen, a sound input device, a device for voice input/recognition, a touch input device, etc. The output device(s) 414 such as a display, speakers, a printer, etc. may also be included. The aforementioned devices are examples and others may be used. The computing device 404 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 406, the removable storage device 409, and the non-removable storage device 410 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 402. Any such computer storage media may be part of the computing device 402. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a personal data assistant, a tablet personal computer, a phablet, a slate, a laptop computer, and the like, with which examples of the invention may be practiced. Mobile computing device 500 may be an exemplary computing device configured for execution of an email service as described herein. Application command control may be provided for applications executing on a computing device such as mobile computing device 500. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 5A, one example of a mobile computing device 500 for implementing the examples is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., touch screen display). If included, an optional side input element 515 allows further user input. The side input element 515 may be a rotary switch, a button, or any other type of manual input element. In alternative examples, mobile computing device 500 may incorporate more or less input elements. For example, the display 505 may not be a touch screen in some examples. In yet another alternative example, the mobile computing device 500 is a portable phone system, such as a cellular phone. The mobile computing device 500 may also include an optional keypad 535. Optional keypad 535 may be a physical keypad or a "soft" keypad generated on the touch screen display or any other soft input panel (SIP). In various examples, the output elements include the display 505 for showing a GUI, a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 can incorporate a system (i.e., an architecture) 502 to implement some examples. In one examples, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA), tablet and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device (e.g. system 502) described herein.

The system 502 has a power supply 570, which may be implemented as one or more batteries. The power supply 570 might further include an external power source, such as an AC adapter or a powered docking cradle that supplements or recharges the batteries.

The system 502 may include peripheral device port 530 that performs the function of facilitating connectivity between system 502 and one or more peripheral devices. Transmissions to and from the peripheral device port 530 are conducted under control of the operating system (OS) 564. In other words, communications received by the peripheral device port 530 may be disseminated to the application programs 566 via the operating system 564, and vice versa.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525 (as described in the description of mobile computing device 500). In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525 (shown in FIG. 5A), the audio interface 574 may also be coupled to a microphone to receive audible input, such as to facilitate a telephone conversation. In accordance with examples of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one example of the architecture of a system for providing an application that reliably accesses target data on a storage system and handles communication failures to one or more client devices, as described above. The system of FIG. 6 may be an exemplary system configured for execution of an email service as described herein. Target data accessed, interacted with, or edited in association with programming modules 408 and/or applications 420 and storage/memory (described in FIG. 4) may be stored in different communication channels or other storage types. For example, various documents may be stored using a directory service 622, a web portal 624, a mailbox service 626, an instant messaging store 628, or a social networking site 630, application 428, IO manager 424, other utility 426, and storage systems may use any of these types of systems or the like for enabling data utilization, as described herein. A server 620 may provide storage system for use by a client operating on general computing device 402 and mobile device(s) 500 through network 615. By way of example, network 615 may comprise the Internet or any other type of local or wide area network, and a client node may be implemented for connecting to network 615. Examples of a client node comprise but are not limited to: a computing device 402 embodied in a personal computer, a tablet computing device, and/or by a mobile computing device 500 (e.g., mobile processing device). As an example, a client node may connect to the network 615 using a wireless network connection (e.g. WiFi connection, Bluetooth, etc.). However, examples described herein may also extend to connecting to network 615 via a hardwire connection. Any of these examples of the client computing device 402 or 500 may obtain content from the store 616.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   applying a machine learning model that is configured to generate a rich content preview of a bundle of emails by executing processing that:
   evaluates email content associated with the bundle of emails, wherein the bundle of emails comprises a grouping of at least two separate email threads and one or more entity tags providing an entity type classification for the grouping of the at least two separate email threads,
   identifies a task state requiring a user action to respond to a request within the email content of the bundle of emails,
   determines relevancy of specific email content in association with a determined entity type for the bundle of emails and the task state identified within the email content of the bundle of emails, and
   generates the rich content preview of the bundle of emails based on an evaluation result determined from the applying of the machine learning model, wherein the rich content preview comprises:
   one or more portions of the email content extracted from the bundle of emails, and
   one or more actionable links that comprise a link for a user to respond to the request associated with the task state through the rich content preview; and
   transmitting data associated with the rich content preview of the bundle of emails for presentation through an email service.

2. The method of claim 1, wherein the one or more portions of content of the rich content preview comprise summary information for the bundle of emails, wherein the summary information is generated based on a relevancy evaluation of the specific email content in association with the entity type classification.

3. The method of claim 2, wherein the machine learning model, in evaluating the relevancy of the specific email content, further evaluates user signal data that corresponds to a user account associated with the bundle of emails, and wherein the rich content preview is a user-specific rich content preview that tailors the summary information based on an evaluation of the user signal data.

4. The method of claim 2, wherein the one or more portions of content of the rich content preview comprise image content extracted from the bundle of emails, wherein the image content is selected based on the relevancy evaluation of the specific email content in association with the entity type classification.

5. The method of claim 1, wherein the rich content preview further comprises user interface features for management of the bundle of emails.

6. A system comprising:
   at least one processor; and
   a memory operatively connected with the at least one processor storing computer-executable instructions that, when executed by the at least one processor, causes the at least one processor to execute a method that comprises:
applying a machine learning model that is configured to generate a rich content preview of a bundle of emails by executing processing that:
evaluates email content associated with the bundle of emails, wherein the bundle of emails comprises a grouping of at least two separate email threads and one or more entity tags providing an entity type classification for the grouping of the at least two separate email threads,
identifies a task state requiring a user action to respond to a request within the email content of the bundle of emails,
determines relevancy of specific email content in association with a determined entity type for the bundle of emails and the task state identified within the email content of the bundle of emails, and
generates the rich content preview of the bundle of emails based on an evaluation result determined from the applying of the machine learning model, wherein the rich content preview comprises:
one or more portions of the email content extracted from the bundle of emails, and
one or more actionable links that comprise a link for a user to respond to the request associated with the task state through the rich content preview; and
transmitting data associated with the rich content preview of the bundle of emails for presentation through an email service.

7. The system of claim 6, wherein the one or more portions of content of the rich content preview comprise summary information for the bundle of emails, wherein the summary information is generated based on a relevancy evaluation of the specific email content in association with the entity type classification.

8. The system of claim 7, wherein the machine learning model, in evaluating the relevancy of the specific email content, further evaluates user signal data that corresponds to a user account associated with the bundle of emails, and wherein the rich content preview is a user-specific rich content preview that tailors the summary information based on an evaluation of the user signal data.

9. The system of claim 7, wherein the one or more portions of content of the rich content preview comprise image content extracted from the bundle of emails, wherein the image content is selected based on the relevancy evaluation of the specific email content in association with the entity type classification.

10. The system of claim 6, wherein the rich content preview further comprises user interface features for management of the bundle of emails.

11. A computer storage media storing computer-executable instructions that, when executed by at least one processor, causes the at least one processor to execute a method comprising:
applying a machine learning model that is configured to generate a rich content preview of a bundle of emails by executing processing that:
evaluates email content associated with the bundle of emails, wherein the bundle of emails comprises a grouping of at least two separate email threads and one or more entity tags providing an entity type classification for the grouping of the at least two separate email threads,
identifies a task state requiring a user action to respond to a request within the email content of the bundle of emails,
determines relevancy of specific email content in association with a determined entity type for the bundle of emails and the task state identified within the email content of the bundle of emails, and
generates the rich content preview of the bundle of emails based on an evaluation result determined from the applying of the machine learning model, wherein the rich content preview comprises:
one or more portions of the email content extracted from the bundle of emails, and
one or more actionable links that comprise a link for a user to respond to the request associated with the task state through the rich content preview; and
transmitting data associated with the rich content preview of the bundle of emails for presentation through an email service.

12. The computer storage media of claim 11, wherein the one or more portions of content of the rich content preview comprise:
summary information for the bundle of emails, wherein the summary information is generated based on a relevancy evaluation of the specific email content in association with the entity type classification, and
image content extracted from the bundle of emails, wherein the image content is selected based on the relevancy evaluation of the specific email content in association with the entity type classification.

13. The method of claim 1, wherein the task state is an unresolved meeting request within the email content of the bundle of emails, and wherein the one or more actionable links comprise a link to resolve the unresolved meeting request.

14. The system of claim 9, wherein the task state is an unresolved meeting request within the email content of the bundle of emails, and wherein the one or more actionable links comprise a link to resolve the unresolved meeting request.

15. The computer storage media of claim 11, wherein the task state is an unresolved meeting request within the email content of the bundle of emails, and wherein the one or more actionable links comprise a link to resolve the unresolved meeting request.

16. The method of claim 1, wherein the generating comprises: rendering the rich content preview for the bundle of emails, and wherein the transmitting transmits a rendering of the rich content preview for presentation through the email service.

17. The method of claim 1, wherein the transmitting comprises propagating the data associated with the rich content preview of the bundle of emails to a component of the email service for rendering a representation of the rich content preview.

18. The method of claim 1, further comprising: filtering message content from a user account of the email service to identify the email content associated with the bundle of emails based on the one or more entity tags, wherein the email content is evaluated based on results of the filtering.

19. The system of claim 6, wherein the generating comprises: rendering the rich content preview for the bundle of emails, and wherein the transmitting transmits a rendering of the rich content preview for presentation through the email service.

20. The computer storage media of claim 11, wherein the generating comprises: rendering the rich content preview for the bundle of emails, and wherein the transmitting transmits a rendering of the rich content preview for presentation through the email service.

* * * * *